United States Patent [19]

Zeller

[11] Patent Number: 4,631,196

[45] Date of Patent: Dec. 23, 1986

[54] LOW CALORIE DAIRY PRODUCT

[76] Inventor: Clifford L. Zeller, 11628 North Shore Cliff La., Mequon, Wis. 53092

[21] Appl. No.: 723,319

[22] Filed: Apr. 15, 1985

[51] Int. Cl.$^4$ .......................... A23C 9/154; A23C 9/20
[52] U.S. Cl. ..................................... 426/580; 426/565; 426/567; 426/576; 426/804; 426/583
[58] Field of Search ............... 426/565, 567, 804, 580, 426/576

[56] References Cited

U.S. PATENT DOCUMENTS

| | | | |
|---|---|---|---|
| 2,876,104 | 3/1959 | Bliudzius | 426/565 |
| 3,620,757 | 11/1971 | Ellinger et al. | 426/565 |
| 3,809,764 | 5/1974 | Gabby et al. | 426/565 |
| 4,376,791 | 3/1983 | Holbrook | 426/565 |
| 4,400,405 | 8/1983 | Morley et al. | 426/565 |
| 4,435,439 | 3/1984 | Morris | 426/565 |
| 4,497,841 | 2/1985 | Wudel | 426/565 |
| 4,552,773 | 11/1985 | Kahn et al. | 426/565 |

*Primary Examiner*—Jeanette Hunter
*Attorney, Agent, or Firm*—Andrus, Sceales, Starke & Sawall

[57] ABSTRACT

A low cholesterol, low calorie, no fat dairy product, consisting essentially of, in unflavored form, a blend of up to 40% by weight water, about 30% to 70% by weight of a no-fat protein containing material selected from the group consisting of skim milk and cultured skim milk, 5% to 30% by weight sugars consisting of a mixture of 10% to 90% polydextrose and 90% to 10% fructose, about 2% to 8% by weight milk derived solids, and about 0.2% to 2.5% by weight stabilizers and emulsifiers. The product may be refrigerated and served as a mousse dessert or snack, or may be frozen and served as a frozen dessert or snack. A method for producing the product is also disclosed herein.

10 Claims, No Drawings

LOW CALORIE DAIRY PRODUCT

BACKGROUND AND SUMMARY OF THE INVENTION

The present invention relates to food compositions, and more particularly to a low cholesterol, low calorie, no-fat dairy product. The invention embraces a composition of ingredients and processing steps which provide the new product.

In recent years, low calorie dairy products that can be eaten as a dessert or snack food have become increasingly popular. For example, Eisfeldt U.S. Pat. No. 4,312,891 illustrates a cheese cake type dessert product which has a reversible gel structure composed of an aqueous mixture of gel forming gum such as gelatin, a sweetening agent, starch and a proteinaceous source such as cottage cheese. The Eisfeldt dessert product, however, has a fat content of from about 15 to 25%, and this is unacceptable for many people who prefer to be on a no-fat diet. Trop et al U.S. Pat. No. 4,338,347 shows a powdered composition for mixing with a liquid to obtain a mousse product. Again, however, the mousse product of Trop et al includes a relatively high fat content which is derived from the lipid component incorporated in the powdered composition.

Moreley et al, U.S. Pat. No. 4,346,120 illustrates a frozen dessert product which emulates the features of soft serve ice cream which has a fat content of 5% to 15% by weight and a relatively high sugar content of 20% to 40% by weight. Moreley et al, U.S. Pat. No. 4,400,406 is another example of a frozen dessert product which includes a fat constituent of up to about 15% by weight of the product and a high sugar content of between 18% to 30% by weight of the product. Although Moreley et al U.S. Pat. No. 4,400,405 discloses a frozen dessert product which is formulated without a fat constituent, the sugar content of the dessert accounts for between 25% to 29% by weight of the product, which again is unacceptably high for people desiring a low calorie yet good tasting dessert or snack.

Efforts have also been made to reduce the amount of sugar contained in foods. For example, Torres U.S. Pat. No. 4,042,714 shows a composition that can be used as a replacement for some or all of the flour ordinarily used in pastas, pancakes and leavened baked foods. The composition of the Torres low calorie product includes from about 20% to about 75% by weight of a modified polydextrose as a substitute for sugars.

Various other types of food compositions such as cheese cakes are disclosed in Sakamoto et al, U.S. Pat. No. 4,425,369; gelatin mixes in Fiscella, U.S. Pat. No. 4,391,834; dietetic cake mixes in Radlove, U.S. Pat. No. 4,379,174; and ready-to-eat frozen gelatin mixes in Topalian et al, U.S. Pat. No. 4,297,379.

Accordingly, it is an object of the present invention to provide a low cholesterol, low calorie, no fat dairy product which may be eaten in refrigerated or frozen form as a dessert or snack.

It is a further object of the invention to provide a low cholesterol, low calorie, no fat dessert or snack that has a rich and pleasing taste which can be prepared without a fat constituent.

It is a further object of the invention to provide a dessert or snack which can be formulated without any significant amount of artificial sweeteners, and to numerous gourmet flavors.

Therefore, in one aspect, the invention includes a low cholesterol, low calorie, no fat dairy product, consisting essentially of, in unflavored form, a blend of water, a no fat protein containing material selected from the group consisting of skim milk and cultured skim milk, sugars consisting of a mixture of 10% to 90% polydextrose (a bulking agent possessing only 1 calorie per gram) and 90% to 10% fructose, milk derived solids, stabilizers and emulsifiers. The water may account for up to about 40% by weight of the product while the no fat protein containing material may account for about 30% to 70% by weight of the product. The sugars account for only about 5% to 30% by weight of the product while the milk derived solids account for about 2% to 8% by weight of the product and the stabilizers and emulsifiers account for about 0.2% to about 2.5% by weight of the product.

In another aspect of the invention, a method for producing a low cholesterol, low calorie, no fat dairy product includes the steps of dissolving a gelatin in water at a temperature sufficient to dissolve the gelatin and form a gelatin mix, cooling the dissolved mix, preparing a blend of sugars consisting of polydextrose and fructose, milk derived solids, stabilizers and emulsifiers, homogenizing the cooled dissolved gelatin mix and the blend with a no fat protein containing material, pasteurizing the homogenized mixture while simultaneously agitating the homogenized mixture, and cooling the pasteurized mixture to less than 70° F. for serving. The pasteurized mixture may then be whipped with the desired flavor to form a mousse like product, or may be cooled until frozen and served like ice cream with a 50% to 90% overrun.

DESCRIPTION OF THE PREFERRED EMBODIMENT

A low cholesterol, low calorie, no fat dairy product. The product includes a blend of water, a no fat protein containing material, sugars, stabilizers and emulsifiers. The product is prepared without any ingredient that has primarily a fat introducing function. The food product thus is low in calories and has only a low level of cholesterol. Although the product is characterized as having "no fat" the product will have a finite minute level of fat, typically under 1% by weight. This level results from the fat present in commercial skim milk or cultured skim milk used as a protein ingredient and from the fat present in emulsifying ingredients. The product, however, may be termed "no fat" since this term is used herein to indicate that no additional fat constituent has been added to the product.

Typically, a fat constituent is added to dietetic dairy products in order to provide the creamy taste, smoothness, body, and eating characteristics associated with ice cream like desserts and snacks. However, the attainment of these desirable characteristics in the dairy product of the present invention, without a fat constituent and with a low level of sugar, is believed unexpected especially in view of the fine and pleasing taste of the product of the present invention.

One particular feature of the product of the present invention is that it has both a desired low specific gravity as well as substantial body and texture acceptable and satisfactory for a dietetic product. The formulation of this product enables it to be whipped with a significant amount of air to attain the desired low specific gravity. The ice cream industry typically describes the amount of air in a product as "overrun". This term measures the percentage by which the volume of the liquid mix for a product is increased during whipping and freezing. Thus, when one gallon of mix produces two gallons of finished product, the overrun is 100%. The overrun of the dairy product of the present invention typically lies between about 50% to 90%. These amounts approximate the amount of overrun normally found in regular ice cream, and thus the product emulates the consistency of ice cream when served in its frozen form, as will hereinafter be described.

Water is present in the new product as a dispersion medium for the other ingredients of the emulsified product. The water content generally accounts for up to about 40% by weight of the product, not including the water present in other ingredients, for example, skim milk. Water preferably constitutes between about 5% to 35% by weight of the product. When the product is served in its frozen form, the portion of the water in the product which remains unfrozen due to the freezing point depression caused by the sugars present in the formulation, provides fluidity for the product while at the same time the portion of the water which does freeze forms ice crystals that give the product rigidity. However, an excessive water level will result in a product that is excessively icy, and an insufficient water level results in a product without sufficient body and rigidity.

The protein source of the no fat protein containing material is either skim milk or cultured skim milk. The latter is often referred to as baker's cheese. The no fat protein containing material generally accounts for about 30% to 70% by weight of the product. In its refrigerated form, i.e. to be served as a mousse like dessert or snack, if the content of the no fat protein containing material falls below about 30% by weight the product becomes too runny while if the product contains more than about 70% by weight of the no fat protein containing material the product becomes too cultured tasting i.e. it tastes too much like cottage cheese. When served in frozen form, and the protein constituent is below 30% the product is excessively icy whereas if the protein constituent is above about 70% by weight the product has insufficient body and rigidity.

The flavoring constituent of the present product is selected from known flavoring ingredients according to the desired taste, taking into account the other ingredients. This constituent includes, by way of illustration, Dutch process cocoa which is commercially available from Gill & Duffus, cheese cake, caramel, fruits such as strawberry or blueberry, nuts such as hazel nuts and the like as well as other flavorings both natural and artificial. Note, however, that the ingredient ranges specified herein, unless stated otherwise, are for an unflavored product. Additionally, it should be noted that frozen fresh fruits such as strawberries, blueberries, bananas and the like as well as solid nuts may be incorporated as one of the ingredients of the product up to a total of about 20% by weight of the product, if desired.

The sugar constituent of the present product is a combination or mixture of 10% to 90% polydextrose and 90% to 10% fructose. The sugar mixture accounts for about 5% to 30% by weight of the product. The present invention thus employs a significantly lower amount of added absorbable sugar than other known dietetic products. The sugar mixture provides simultaneous control of freezing point depression, sweetness, body and texture. Too much sugar may cause the product to be too soft and unduly sweet whereas an insufficient amount of sugar will allow an excessive portion of water to freeze when served in its frozen form and insufficient body and rigidity when served at a refrigerated temperature.

As noted, the sugar mixture includes polydextrose which is available from the Pfizer Chemical Company and is a reduced calorie (1 calorie per gram) bulking agent which functions like sugar, but does not contribute sweetness to the product. Polydextrose refers to a water soluable highly branched polydextrose having a number average molecular weight between about 1,500 and 18,000 and containing (a) from about 0.5 to 5 mole percent of polycarboxylic acid ester group where the acid is selected from the group consisting of citric, fumaric, tartaric, succinic, adipic, itaconic and malic acids and (b) from about 5% to 20% by weight of a food acceptable polyol selected from the group consisting of sorbitol, glycerol, erythritol, xylitol, mannitol, and galactitol which is chemically bonded thereto. Polydextrose may be used in either the neutralized liquid (Type N)-30% water or acid (Type A) powder forms. However, the acid form must first be neutralized with a base such as potassium hydroxide prior to its use. The polydextrose replaces the sugar and fat commonly found in prior products of the type herein described so that a low calorie product may be obtained and still have a palletable product with sufficient body and texture.

The sugar mixture utilized in the invention also includes fructose which is preferably obtained in the form of 90% high fructose corn syrup or pure crystalline fructose available from such sources as Batterlite Whitlock or Corn Products, International. The fructose functions to prevent crystalization of the water due to the freezing point depression caused thereby. The fructose is also 1½ times sweeter than other sugars such as sucrose and therefore a significantly lower amount may be utilized with the product of the present invention. Many diabetics may also find this type of sugar more medically acceptable. Artificial sweeteners, such as saccharin or aspartane, can be used to replace a maximum of about half the fructose.

The stabilizer constituent of the product also contributes to the attainment of desired performance features. The stabilizer improves the ability of the product to withstand commercial shelf life without deterioration, and enable the product to hold the overrun. The stabilizer also maintains a perception that the product is free of an undesirable gummy or slimy character. The stabilizer typically is in the range of between about 0.2% to about 2.5% by weight of the product. The amount varies depending upon the strength of the particular stabilizer employed.

The stabilizers function as water binding agents as well as gelling agents and are selected from locust bean gum, guar gum, tara gum, xanthum gum, carrageenan, gelatin, propylene glycol alginate, sodium alginate, pectin, microcrystalline cellulose, cellulose ethers, and cellulose fibers. In particular, the above cellulose ingredients are utilized for water binding functions so that a portion of the water in the product does not crystalize resulting in a product that is smooth to the taste. Cellulose ethers such as methyl cellulose, hydroxypropyl cellulose and hydroxypropyl methylcellulose may also be employed as stabilizers.

The optional emulsifier constituent employed with the product of the present invention controls the degree of emulsification of the product during manufacture to aid in attaining the proper body and texture therefor. Insufficient emulsifying agent may cause the product not to stand up upon whipping. The emulsifier constituent is present in the range of between about 0% to about 1.5% by weight of the product. The emulsifier may be agents such as monoglycerides, diglycerides, distilled monoglycerides, polysorbate 80, polysorbate 65, and ethoxolated mono and diglycerides.

The milk derived solids employed with the product of the present invention function as a protein source as well as in providing the desirable properties of whipping ability, smoothness, body and texture. The milk derived solids employed may be sweet dairy whey, neutralized acid whey, modified whey, whey protein concentrate, casein, modified casein, sodium caseinate, and calcium caseinate. Sodium caseinate is available from New Zealand Milk Products, Inc. under the trade designation Alanate 180 or from Erie Caseine Co. under the trade designation Ecco Code 400. The milk derived solids constituent generally accounts for approximately 2% to 8% by weight of the product. The presence of such milk derived solids not only provide a source of protein but also aid in water binding and the cold set properties of the product.

The preparation of the product according to the invention employs conventional processing equipment. As one step in the process, a gelatin is dissolved in water at a temperature sufficient to dissolve all of the gelatin and form a gelatin mix. Typically, the temperature of the gelatin mix may be about 200° F. The gelatin is well mixed in the water by continuous stirring as the gelatin is introduced into the water. After all of the gelatin is dissolved, the heated gelatin mix is cooled to a temperature of between about 60° F. to about 140° F. This cooling step may be accomplished by either allowing the gelatin mix to air cool or to utilize a refrigerant for faster cooling.

As another step in the preparation of the product in accordance with the present invention, a blend of sugars consisting of 10% to 90% polydextrose and 90% to 10% fructose is prepared and combined with milk derived solids, stabilizers and emulsifiers. Again, the ingredients are combined and well mixed by continuous stirring as the ingredients are introduced. The cooled dissolved gelatin mix and the blend are then homogenized with a no fat protein containing material such as skim milk or cultured skim milk (bakers cheese) to form a smooth mixture. Again, the homogenation step requires that the gelatin mix, blend and no fat protein containing material are well mixed by continuous stirring as the ingredients are introduced. The homogenizing step may be accomplished with any conventional homogenizing equipment in a two stage operation.

The homogenized mixture is then heated as required for pasteurization while simultaneously agitating the homogenized mixture. The pasteurization treatment may be accomplished at a relatively low temperature of about 155° F. for 30 minutes, but may also be carried out at a higher temperature with a correspondingly shorter time on the order of 300° F. for about 2 or 3 seconds. The lower temperature heat treatment is considered preferably to attain better taste in the resultant product.

The pasteurized mixture is then cooled to a temperature of less than 70° F. It is preferable that the pasteurized mixture be cooled to at least 70° F. quickly after complete pasteurization and preferably within about 1 minute of pasteurization. This prompt initial cooling maintains a manageable viscosity in the mixture so that it can be processed without cloggging or plugging the processing equipment.

The cooled pasteurized mixture resulting from the preceding step may then be subjected to freezing and aeration to provide a frozen product. The aeration is sufficient to attain an overrun of between about 50% to about 90%. The freezing and aeration can, for example be performed with a conventional ice cream freezer which whips the product while dropping its temperature to below freezing. The whipping and freezing operation is continued until the product has attained the desired specific gravity at a temperature of below 24° F. and preferably in the range of 15° F. to 20° F. The product is removed from the equipment at this temperature and packaged, after which the packaged product may be hardened by reducing the temperature to below 0° F. The freezing and whipping operation can include the injection of gas such as air, nitrogen, carbon dioxide, nitrous oxide or a combination of these gases.

Alternately, the cooled pasteurized mixture resulting from the preceding step may be whipped with any desired flavor without freezing to the desired amount of overrun with any commercially available high sheer whipping equipment. The whipped product may then be packaged and chilled in a range of 30° F. to about 45° F. for shipment. Thus, in this latter operation the product may be served at a refrigerated temperature similar to a yogurt based product or mousse product while if frozen the product may be served in a form similar to ice cream.

The invention will be more fully understood in the light of the following specific examples which are set forth below in the illustration only and are not intended to be limiting. In the examples, all percentages are by weight unless otherwise stated.

EXAMPLE I

One example of the new product formulated and processed in the foregoing manner was prepared with the following ingredients:

| Ingredient | Percent by Weight |
| --- | --- |
| Bakers cheese | 50.7 |
| water | 25.0 |
| polydextrose N | 7.4 |
| sodium caseinate | 3.4 |
| gelatin | 0.6 |
| flavors | 7.1 |
| gums | 0.1 |
| 90% high fructose corn syrup | 4.5 |
| emulsions | 0.2 |

The product was prepared as described herein and was refrigerated but not frozen. The product in accordance with the above composition was prepared with three different flavors, namely, Mero MF 277-e bacon; and Borden 1127 spray dried cheddar cheese or nacho cheese. The resulting product had excellent taste and firm texture which remained under refrigeration conditions for several days.

EXAMPLE II

| Ingredient | Percent by Weight |
| --- | --- |
| 36% solids non fat skim milk | 31.0 |
| water | 30.0 |
| polydextrose | 14.0 |
| crystalline fructose or | 11.0 |

-continued

| Ingredient | Percent by Weight |
|---|---|
| 90% fructose corn syrup | |
| cultured skim milk | 10.0 |
| gelatin (225 Bloom) | 0.8 |
| microcrystalline cellulose | 1.3 |
| sodium caseinate | 2.0 |

The above product was formulated with coffee flavor and nut flavors which produced a rich frozen dessert after freezing and aeration in a convention ice cream freezer. This product could be formulated with any desired flavor.

EXAMPLE III

| Ingredients | Percent by Weight |
|---|---|
| 36% solids condensed skim milk | 32.0 |
| cultured skim milk | 14.0 |
| sodium caseinate | 2.0 |
| water | 18.0 |
| gelatin (225 Bloom) | 0.8 |
| microcrystalline cellulose | 1.2 |
| polydextrose Type N | 18.0 |
| 90% fructose corn syrup | 14.0 |

The above product was flavored with natural vanilla and again with a cheesecake extract and then processed with aeration in an ice cream machine. The resulting products were made into a pie form and also into individual scoops in a frozen or partially thawed state as a cheesecake type dessert or mousse.

EXAMPLE IV

| Ingredients | Percent by Weight |
|---|---|
| Skim milk | 65.5 |
| water | 10 |
| polydextrose | 6.8 |
| sodium caseinate | 6.3 |
| 90% fructose corn syrup | 4.6 |
| flavors | 4.5 |
| gelatin | 0.9 |
| gums | 0.2 |
| emulsifiers | 0.2 |

The above product was formulated utilizing natural cocoa as one flavor resulting in a chocolate mousse, and in a second form with a strawberry flavor resulting in a strawberry mousse.

EXAMPLE V

| Ingredients | Percent by Weight |
|---|---|
| 36% solids condensed skim milk | 30.0 |
| non fat milk solids | 5.0 |
| sodium caseinate | 2.0 |
| water | 36.0 |
| gelatin (225 Bloom) | 0.8 |
| microcrystalline cellulose | 1.3 |
| polydextrose powder | 14.0 |
| pure crystalline fructose | 10.0 |
| flavors | 1.0–3.0 |

The above product was subjected to freezing and aeration in a conventional ice cream freezer and served as a frozen dessert. The product had an excellent taste and pleasing mouth feel.

Various modes of carrying out the invention are contemplated as being within the scope of the following claims particularly pointing out and distinctly claiming the subject matter which is regarded as the invention.

I claim:

1. A low cholesterol, low calorie, no-fat dairy product, consisting essentially of, in unflavored form, a blend of water, a no-fat protein-containing material selected from the group consisting of skim milk and cultured skim milk, sugars consisting of a mixture of 10% to 90% polydextrose and 90% to 10% fructose, milk-derived solids, stabilizers and emulsifiers, said water accounting for up to about 40% by weight of the product, said no-fat protein-containing material accounting for about 30% to 70% by weight of the product and having a total milk solids content of about 20% to about 25% by weight said sugars accounting for about 5% to 30% by weight of the product, said milk-derived solids accounting for about 2% to 8% by weight of the product, and said stabilizers and emulsifiers accounting for about 0.2% to 2.5% by weight of the product.

2. The dairy product of claim 1, wherein said milk-derived solids are selected from the group consisting of sweet dairy whey, neutralized acid whey, modified whey, whey protein concentrate, casein, modified casein, sodium caseinate, calcium caseinate and mixtures thereof.

3. The dairy product of claim 1, wherein said stabilizers are selected from the group consisting of locust bean gum, guar gum, tara gum, xanthum gum, carrageenan, gelatin, proplylene glycol alginate, sodium alginate, pectin, microcrystalline cellulose, cellulose ethers, cellulose fibers, and mixtures thereof.

4. The dairy product of claim 1, wherein said emulsifiers are selected from the group consisting of monoglycerides, diglycerides, polysorbate 80, polysorbate 65, and mixtures thereof.

5. The dairy product of claim 1, wherein said blend includes 20% to 40% by weight water, 30%–70% by weight skim milk and cultured skim milk, 10% to 20% by weight polydextrose, 1% to 4% by weight sodium caseinate, 10% to 15% by weight fructose, 0.5% to 1.0% gelatin, and about 1.3% by weight stabilizers.

6. The dairy product of claim 1, wherein said blend includes 15% to 35% by weight water, 50% to 57% by weight cultured skim milk, 5% to 10% by eight polydextrose, 3% to 5% by weight sodium caseinate, 4.5% to 6% by weight fructose, 0.5% to 1.0% by weight gelatin, about 0.2% by weight stabilizers, and about 0.2% by weight emulsifiers.

7. A method for producing a low cholesterol, low calorie, no-fat dairy product, comprising the steps of:
dissolving a gelatin in water at a temperature sufficient to dissolve the gelatin and form a gelatin mix, said gelatin accounting for 0.5% to 1.5% by weight of the product;
cooling the dissolved mix to a temperature of between about 60° F. to about 140° F.;
preparing a blend of sugars consisting of 10% to 90% polydextrose and 90% to 10% fructose, milk-derived solids, stabilizers and emulsifiers, said sugars accounting for about 5% to 30% by weight of the product, said milk-derived solids accounting for about 2% to 8% by weight of the product, and said stabilizers and emulsifiers accounting for about 0.2% to 2.5% by weight of the product;
homogenizing the cooled dissolved gelatin mix and said blend with a no-fat protein-containing material selected from the group consisting of skim milk and cultured skim milk to form a smooth mixture, said no-fat protein-containing material accounting for about 30% to 70% by weight of the product and having a total milk solids content of about 20% to about 25% by weight;

pasteurizing the homogenized mixture while simultaneously agitating the homogenized mixture; and cooling the pasteurized mixture to about 70° F.

8. The method of claim 7, including the further step of whipping the pasteurized mixture creating an overrun of from 10% to 100% by volume of the product while simultaneously mixing said pasteurized mixture with a desired flavoring agent, and thereafter cooling the whipped mixture to a temperature of between about 32° F. to about 45° F.

9. The method of claim 7, including the further step of whipping the pasteurized mixture creating an overrun of from 10% to 100% by volume of the product, and thereafter freezing the whipped mixture.

10. The method of claim 9, wherein the whipped mixture is frozen at a temperature of between about 15° F. to about 24° F.

* * * * *